May 24, 1927.
W. H. WILSON
CARPET SPOOL
Filed Dec. 31, 1926
1,630,155
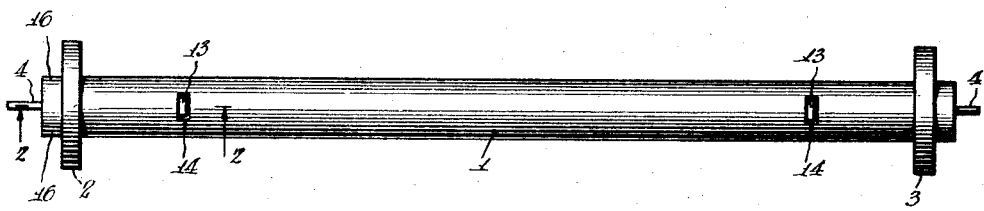
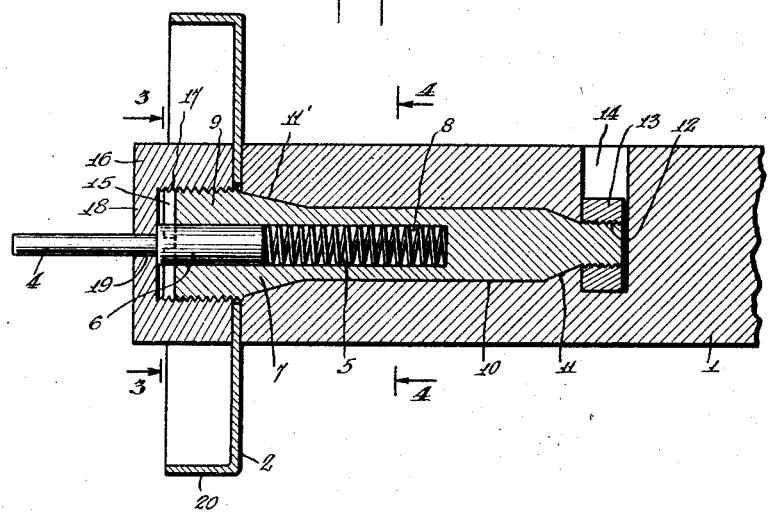
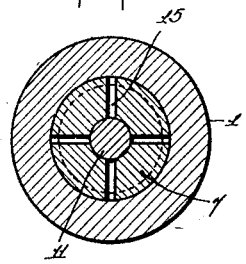
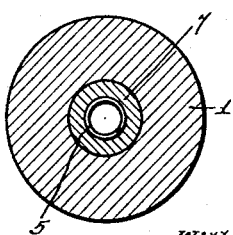
WITNESSES
INVENTOR
William H. Wilson.
BY
ATTORNEY Patented May 24, 1927.

1,630,155

UNITED STATES PATENT OFFICE.

WILLIAM H. WILSON, OF BURLINGTON, VERMONT, ASSIGNOR TO VERMONT SPOOL & BOBBIN COMPANY, OF BURLINGTON, VERMONT, A CORPORATION OF VERMONT.

CARPET SPOOL.

Application filed December 31, 1926. Serial No. 158,313.

This invention relates to spools and particularly to what are known as carpet spools and has for an object to provide an improved construction wherein an efficient journal is provided with means for efficiently holding the same in place.

Another object is to provide in a carpet spool an improved form of support for a spring pressed bearing pin, the support being arranged to also carry a removable head.

In the accompanying drawing—

Figure 1 is an elevation of a carpet spool disclosing an embodiment of the invention.

Figure 2 is an enlarged fragmentary sectional view through Figure 1, the same being taken on line 2—2 of Figure 1.

Figure 3 is a transverse sectional view through Figure 2 on line 3—3.

Figure 4 is a transverse sectional view through Figure 2 on line 4—4.

Referring to the accompanying drawing by numerals, 1 indicates the barrel or body of a spool and 2 and 3 the heads. As the respective heads are identical in structure and as the means associated with the heads 2 and 3 are identical, the description of one will apply to both.

In carpet spools, the journal pins 4 are spring pressed usually and one pin must be held in an extended position by a spring so that it may be snapped into place and the spool held against accidental removal. In the present invention, the pin 4 is held in an extended position by the spring 5 pressing against the enlarged end 6. The enlarged end 6 is preferably of an appreciable length so as to be guided by the supporting shaft 7. The bore 8 is made of a size that the enlarged end 6 will slidingly fit therein and spring 5 would easily function to hold the pin 4 in its outer position. The shaft 7 is provided with an exteriorly threaded enlarged end 9, a cylindrical body 10, a tapering section 11 and an externally threaded reduced end 12. The reduced end 12 is adapted to receive the nut 13 which is fitted into the slot 14. The slot 14 is preferably rectangular and also the nut 13 is preferably rectangular whereby the nut will not turn when the shaft 7 is screwed in tightly. The end face of end 9 is preferably provided with a number of slots or kerfs 15 whereby a screw driver of ordinary structure or of special structure may be used for screwing the shaft 7 into position. As this shaft is screwed into position, the sections 11 and 11' will press against corresponding beveled surfaces on the body 1 whereby the shaft is firmly clamped to the body and is rigidly held in position so that the end 9 acts substantially as an integral extension of body 1. The body 1 is preferably made of wood while shaft 7 is preferably made from metal.

Surrounding the end 9 and resting against the end of body 1 is the head 2 which is clamped in position by the nut 16 which is preferably round though it could be some other shape. The nut interiorly is provided with threads 17 adapted to be screwed onto the threaded end 9 until the nut 16 presses the head 2 tightly against body 1. When this is done there is still a slight space between the end 9 and the end portion 18. End portion 18 is provided with a bore 19 through which the pin 4 extends. It will be noted from Figure 2 that the enlargement 6 presses against the end portion 18 and is held tightly against the same by spring 5. Preferably, the head 2 is formed with an integral flange 20 so that if desired, a spring or other braking member may be caused to press against this flange and prevent any momentum of the spool and also retard its rotation if desired and thereby give tension to the yarn being fed therefrom.

What I claim is:

1. A carpet spool comprising a body, a pair of heads and means for holding the heads in place, each of said means comprising a supporting shaft, a nut for each shaft for locking the respective shafts to the body, each of said shafts having a bore extending inwardly from one end, a journal pin associated with each shaft, each of the journal pins having an enlargement whereby the respective enlargements may fit into the bores of the respective shafts, a spring arranged in each of the bores for urging the respective pins outwardly, and a clamping nut screwed onto the outer surface of the end of each of said supporting shafts for clamping the respective heads to the body, each of said nuts being formed with an apertured end, said ends being positioned to guide and support the respective pins and limit the outward movement of the pins.

2. A carpet spool comprising a barrel, a head fitted against one end of the barrel, a supporting shaft fitted into said barrel with one end projecting beyond the barrel, said projecting end being exteriorly threaded, a clamping nut screwed onto said threaded end for clamping said head in place, said clamping nut being closed on one end except for a small bore, a journal pin extending through said small bore, said journal pin having an enlargement slidingly mounted in said shaft, and a spring acting on said enlargement for pressing the same against said clamping nut.

3. A carpet spool including a barrel having a bore at one end and a radially extending opening spaced from the end and bisecting the bore, said bore having a tapering section for each end, a supporting shaft positioned in said bore and formed with a tubular part and a pair of tapering sections matching the shape of the bore, a nut arranged in said radial opening, said shaft having a threaded end section adapted to be screwed into said nut whereby the nut will hold the shaft in place, said shaft having an enlarged externally threaded end projecting from the end of the barrel, a head plate fitting against the end of the barrel and surrounding the enlarged end of the shaft, a clamping nut adapted to be screwed onto said shaft for clamping the head against the barrel, said nut having a comparatively small bore at one end, a journal pin formed with an enlarged portion and a restricted portion, said restricted portion extending through said bore, said shaft being hollow for part of its length, said hollow part being of a size to receive the enlarged part of said pin, and a spring arranged in the hollow part of the shaft acting on the shaft and on the pin for holding the pin normally in extended position.

4. A carpet spool including a barrel having a bore extending from one end toward the other, said bore having a tubular section and a pair of tapering sections, a radially positioned opening merging into the bore at one end of the bore, a supporting shaft having the exterior part of the same shaped as the bore so as to tightly fit in the bore when in operative position, a nut positioned in said opening and screwed onto said shaft for clamping the shaft in said bore, a head member, means engaging the shaft for clamping the head member in place, and means acting as a journal pin.

5. In a carpet spool a barrel provided with a bore at one end, said bore having a flaring portion, a supporting shaft having a tapering portion adapted to fit against the flaring portion, means for clamping the shaft in the barrel with the tapering portion of the shaft pressing against the flaring portion of the bore, a head, a journal pin associated with the head and shaft, and means for clamping the head in position and holding the journal pin in operative position.

6. In a carpet spool a wood body, a shaft fitted into one end of said body, said shaft being formed with a bore extending from one end inwardly axially, means for holding said shaft in operative position in said body, a journal pin formed with an enlarged end, said bore accommodating said enlarged end, and a spring positioned in said bore and acting on said enlarged end for resiliently holding said pin in a certain position.

WILLIAM H. WILSON.